Patented Aug. 23, 1932

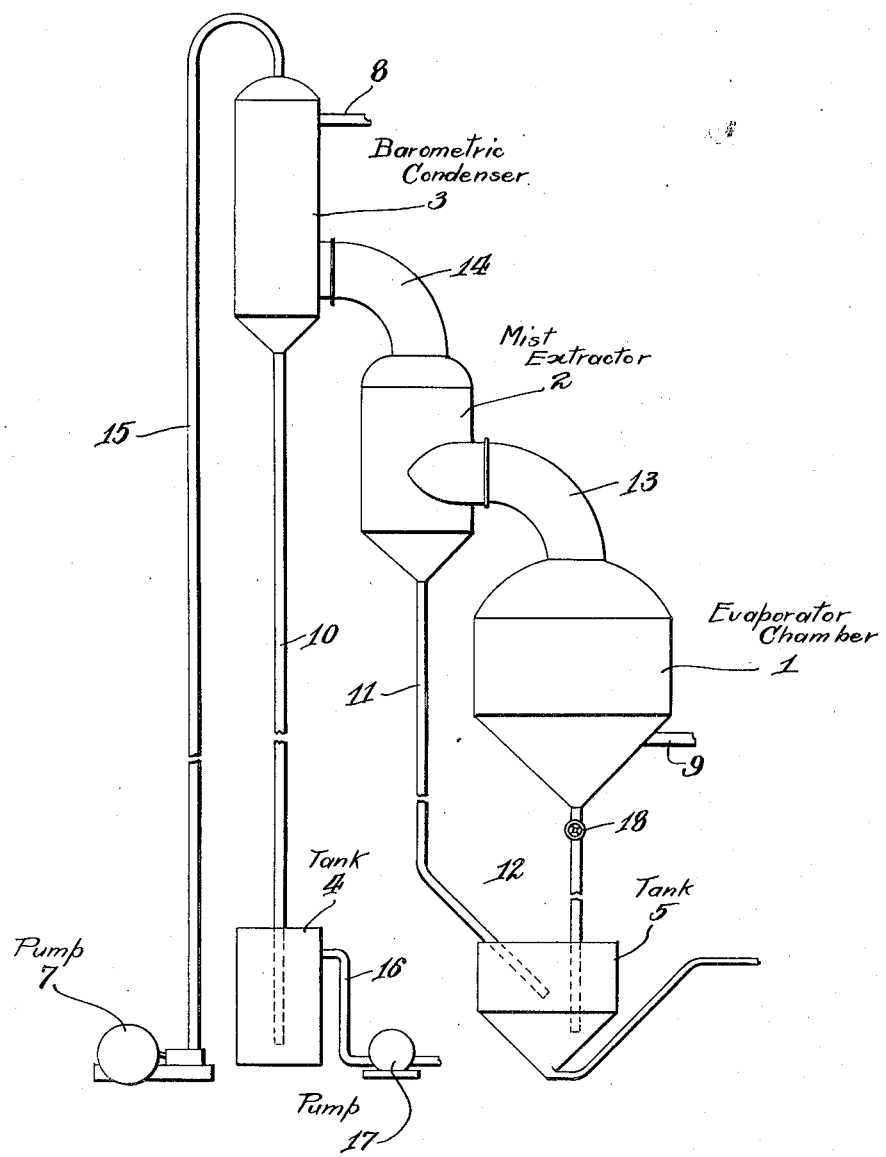

1,873,329

UNITED STATES PATENT OFFICE

CHARLES F. RITCHIE AND WILLIAM A. GALE, OF TRONA, CALIFORNIA, ASSIGNORS TO AMERICAN POTASH & CHEMICAL CORPORATION, OF TRONA, CALIFORNIA, A CORPORATION OF DELAWARE

PROCESS OF EVAPORATIVE COOLING

Application filed July 12, 1929. Serial No. 377,772.

This invention relates to improvements in the art of maintaining reduced pressure within evaporative equipment, wherein the reduced pressure is maintained by bringing said vapors into direct contact with a cold condensing medium. The invention relates especially to means of maintaining reduced pressures within evaporative equipment to which no additional heat is being supplied from an exterior source.

The object of the invention is to provide simple and economical means for maintaining a lower absolute pressure within evaporative equipment than would otherwise be practicable under certain adverse conditions.

Evaporative systems, wherein the reduced pressure is maintained by the condensation of vapors from the boiling liquid directly into a condensing medium, have long been known to the art. Such condensation is usually brought about by conducting the hot vapors into a barometric condenser of standard design, wherein the vapors and the condensing medium are intimately mixed.

When a hot liquor is subjected to such treatment and no heat is supplied from an exterior source, the sensible heat of the liquor causes evaporation of the liquor, simultaneously reducing its temperature. Such a process, known to the art as vacuum cooling or evaporative cooling, has also found considerable application in industry.

It has been found that in many instances the process of evaporative cooling possesses advantages which render it far superior to other known methods of cooling. For example, in the case of cooling hot concentrated solutions of potassium chlorid we have found the process of evaporative cooling extremely advantageous as compared with the ordinary method of heat transfer through pipes. The latter process is generally carried out by passing the hot liquor through a set of pipes cooled externally by water or some other suitable medium. The places may be reversed and the cooling medium circulated through pipes submerged within a tank, or suitable container, filled with the hot liquor. Whatever the system used, we have found that a coating of potassium chlorid is quickly deposited upon the cooling surface, necessitating frequent interruptions of operation for the purpose of removing such deposits.

Many means for circumventing this defect have been suggested, but in no case have they provided as satisfactory results as those obtainable with evaporative cooling equipment operating under correct conditions. In the process of evaporative cooling, heat transfer takes place at the surface of the hot liquor, boiling within its container. Hence solids precipitated as a result are so deposited within the liquor itself, and can in no manner materially retard the transmission of heat, in properly designed equipment. Suitable apparatus for conducting such evaporative cooling is described in United States Letters Patent Number 1,676,277.

Another advantage of evaporative cooling over other common means lies in the economy of equipment required. Evaporative cooling equipment is in general of simple nature, and capable of handling large volumes of liquor.

For the purpose of more fully setting forth the nature of the evaporative cooling process and equipment, and for more clearly explaining the advantages of the present invention, reference is made to the single figure of the drawing, which represents a conventional elevation of a type of apparatus suited to carrying out the invention as applied to evaporative cooling.

Evaporator chamber 1 consists of a suitable vessel to be maintained under reduced pressure, into which the hot liquor is introduced through line 9. 2 represents a mist extractor or similar equipment of standard design, for separating entrained liquor from the vapors. 3 is a standard barometric condenser for bringing about the condensation of the hot vapors. Such a piece of equipment usually consists of a cylindrical chamber having a series of baffles, so arranged within that the stream of condensing medium flowing down from an inlet, 8, near the top, may present a large surface for the condensation of vapors. Tanks 4 and 5 represent hot wells or seals of usual import. Barometric legs 10, 11 and 12 are of such length as to provide a balance between the reduced pressure within the system and the atmospheric pressure without, thereby excluding air from the reduced pressure evaporative system. Vapor lines 13 and 14 serve to conduct vapors from the hot boiling liquor to the barometric condenser 3. Line 15 represents a vent line through which any non-condensable gas, such as air which may collect at the top of the condenser, can be withdrawn by means of a standard vacuum pump or jet exhauster 7. This equipment does not, of course, maintain the vacuum within the system; but simply removes such small quantities of non-condensable gas as may accumulate, which would seriously reduce the efficiency of the entire equipment if not removed.

In operating the above as an evaporative cooling system, reduced pressure is first produced by means of the vacuum pump or jet exhauster 7. Condensing medium is sent to the condenser 3 through line 8. Hot liquor is admitted to the cooling chamber 1 through line 9. Such hot liquor boils under the reduced pressure conditions, the vapor passing through lines 13 and 14 to the barometric condenser 3. The condensing medium, which is thereby heated, passes down the barometric leg 10 into the hot well 4 and is thence removed through line 16 and pump 17.

Hot liquor may be supplied to the evaporator chamber 1, continuously or intermittently, the size, shape and design of said chamber being commensurate with the desired process. Cooled liquor passes through valve 18 and line 12 to the seal tank 5, from which it is withdrawn for further processing. Liquor splashing into the mist extractor may also be sent to the seal tank 5, as shown, or it may be returned directly to the evaporator chamber 1.

The foregoing description of equipment and operation is set forth solely for the purpose of describing a particular case to which the process of the invention may advantageously be applied. In no way should the preceding be construed to limit the scope and usefulness of the invention as hereinafter set forth.

The present invention deals with means of improving the operation of evaporative equipment served by barometric condensers. Prior to the inception of the present invention such systems have been subject to one great defect, which in certain cases has been found to be very disconcerting. This defect has been especially objectionable where such equipment has been employed for the purpose of evaporative cooling; the defect lying in the fact that sufficiently low temperatures have not been obtainable, under certain conditions controlled entirely by local environment and entirely without the control of man.

To one skilled in the art, it is obvious that the minimum absolute pressure, and consequently the minimum temperature to which the liquor within the system may be brought, is determined by the vapor pressure of the condensing medium. In the case of water, the latter is, of course, determined by its temperature. That is to say, the colder the water supplied to the condenser 3 of Figure 1, the lower will be the partial pressure produced within the system, sound engineering principles, of course, being assumed in the design and operation of the equipment. However, we have found that local conditions such as those obtaining in tropical or semi-tropical localities may preclude the possibility of supplying water of the desired temperature to the barometric condenser. The well known and very economical method for cooling water in spray ponds or atmospheric cooling towers has also been found to be ineffective in producing sufficiently cooled water, under certain conditions.

This method of water cooling is dependent upon the relative humidity and temperature of the surrounding atmosphere. The wet bulb temperature, as commonly determined, is the minimum temperature to which water may be cooled by such means. In the specific case of operations on the great Mojave Desert, while the relative humidity of the air is very low, we have found that the wet bulb temperature, especially throughout the summer days, is so high as to preclude this means for producing water of sufficiently low temperature for process work.

Since the specific temperatures must be maintained in certain industrial processes, such adverse conditions, which are not within the control of man, take on a most serious aspect. This defect constitutes a great disadvantage, especially where a high vacuum is absolutely essential for the successful operation of the process. Heretofore it has been necessary to resort to the expensive means of artificial refrigeration in order to obtain the desired temperature. Artificial refrigeration is an expensive procedure and its necessitated employment has in the past detracted considerably from the advantages of the otherwise economical and simple process hereinbefore described.

By the process of this invention we are able to overcome this defect, i. e., the lack of sufficiently cold condenser water, in a simple and efficient manner, without the use of expensive artificial refrigeration, thereby producing a condensing medium of considerably enhanced cooling power.

In the operation of this invention we prefer to start with essentially pure water of the lowest temperature obtainable by economical means. This may consist either of water taken directly from desert wells, which is never very cold, or water which has been previously cooled over atmospheric spray towers to the minimum temperature possible under the existing conditions. To this water we add a large quantity of any suitable salt. The dissolution of most salt, for example, common table salt (sodium chlorid) reduces the temperature of the liquid in which it dissolves. This reduction in temperature is in many cases, especially in the case of hydrated salts, such as Glauber's salts, borax, etc., of material value in producing the desired condensing medium. In addition, it has been found that the vapor pressure of the resulting solution of salt, hereafter referred to as brine, is considerably lower than that of the essentially pure water employed as a solvent. This reduction of vapor pressure constitutes one of the principles upon which the process of this invention is based.

As a concrete example of the operation of the invention, we start with essentially pure spray-tower-cooled water at 85.0° F. We saturate this water with waste salt consisting largely of sodium chlorid, to produce a brine containing approximately 25 percent of salt by weight. The dissolution of the salt in the water lowers the temperature of the solution approximately 3.5° F., or from 85.0° F. to 81.5° F. Furthermore, we have found that the vapor pressure of the resulting brine is approximately 21 millimeters of mercury, as compared with a vapor pressure of 31 millimeters of mercury for the original solvent; which prior to the inception of this invention was the best (unrefrigerated) condensing medium available during certain seasons of the year.

By employing this saturated brine as a condensing medium we have been able to reduce the temperature of the contents of the evaporator chamber approximately 12° F. lower than the temperature previously obtainable when using the essentially pure water, prior to its treatment according to the precepts of this invention. Such a reduction of temperature, or otherwise stated, such an increase in the efficiency of the condensing medium represents, on large scale production, an enormous saving of money that would otherwise have to be expended for artificial refrigeration. In many cases the advantage of 12° F. may prove sufficient to entirely eliminate the necessity of an artificial refrigeration installation, thereby further increasing the economy and value of the process of the present invention.

The process of the present invention may also include a preliminary evaporative cooling step in which the solution to be evaporatively cooled is subjected to a stage of evaporative cooling in a primary evaporator chamber which is held under higher absolute pressure than the chamber 1 and from which the vapors pass to a barometic condenser in which they are showered with water as a condensing medium. Then by introducing the remaining solution in the evaporator chamber 1 and subjecting the same to evaporative cooling at a lower pressure and contact of its vapors with the saturated salt solution, a plurality of steps of evaporative cooling are obtained which have a number of advantages.

Many variations in this new and novel process for improving the efficiency of condenser water are, of course, obvious to one skilled in the art. For example, it may be advantageous to employ a fine suspension of crystals, or a sludge, composed of the unsuitable condenser water together with the desired salt, which in many cases may consist of a waste product. As an example of this variation we have added Glauber's salt to warm (95° F.) water in such proportions that the resulting solution when dissolved would contain approximately 20 percent $Na_2SO_4$ by weight. In admixing the crystals and the warm water we have found that the resulting solution is so cooled as to prevent complete solution of the Glauber's salt. However, we have found that the resulting sludge of cold brine and suspended crystals may be satisfactorily pumped to the barometric condenser, thereby producing a very excellent condensing medium. Within the condenser heat is supplied to the sludge, thereby melting the remaining crystals and producing a concentrated brine, according to the precepts of this invention. In this manner satisfactory cooling of the liquor within the evaporator chamber is brought about without the necessity for employing artificial refrigeration means for this purpose.

The salt employed for producing the saturated brine may consist of any suitable material of economical origin. The exact chemical nature of the salt is immaterial, provided it be sufficiently soluble to produce the desired lowering of temperature or vapor pressure or both, of the solvent. In the case of water as the solvent, the salt employed should preferably be an electrolyte.

We prefer to produce the maximum effect obtainable by this process of our invention. Hence throughout we speak of the treated condensing medium as saturated brine. The higher the concentration of salt, the lower will be vapor pressure of the resulting brine. However, when we speak of saturated brine we mean a solution at or near its saturation value with a given salt. It is understood that exact or absolute saturation is difficult of achievement. Hence in the spirit of this invention, a saturated brine is one which is saturated within such limits as are commensurate with the time and expense involved. In the aforementioned case of Glauber's salts we prefer to provide a suspension of crystals in brine. Such a system, of course, may be considered as supersaturated with respect to the existing temperature. However, within the condenser sufficient heat is supplied to dissolve such suspended crystals, thereby producing the aforesaid saturated brine.

In many processes it becomes necessary to remove a large quantity of salt which may have very little intrinsic value. Such a condition obtains in connection with the refining of certain saline waters resulting from the evaporation of old lake bodies, such as Searles Lake in California. The residual waters of Searles Lake contain, besides the valuable borax and potash constituents, a considerable quantity of sodium sulphate. Such sodium sulphate has proven undesirable in certain processes of refining, and means have been provided for its removal prior to evaporation for the recovery of the more valuable constituents.

Sodium sulphate may be removed, by a process of refrigeration, in the form of Glauber's salt. Due to the low market price of this material, the enormous quantity produced and the isolation of its place of production, it is regarded entirely as a waste product. However, we have found it to be a very valuable material for the operation of the process of our invention, as hereinbefore described.

Searles Lake and similar brines also contain a large quantity of common salt, which for the above mentioned reasons, possesses very little intrinsic value. In the evaporation of Searles Lake brine for the recovery of its valuable borax and potash constituents, a large quantity of sodium chlorid together with sodium carbonate is eliminated. These sodium salts are produced and separated according to co-pending applications, Serial No. 308,496, filed September 26, 1928, and Serial No. 309,279, filed September 29, 1928. The sodium chlorid so produced, while separated to a fair degree, contains sufficient impurities to prevent its sale as table salt. Hence it must be discarded as a waste salt or redissolved for further refining. We have found that such waste salt is a very valuable reagent for the operation of our invention, as hereinbefore described.

From the foregoing exposition it is obvious that one or more salts may be employed for the operation of the process of this invention. Such multi-component brines may be produced by intent or may be the result of the utilization of impure materials.

The spent or heated condenser brine may be discarded, as would be the natural course of events in the case of a waste salt, or it may be employed in processes involving the recovery of the solute so dissolved.

While the invention has been set forth in terms of artificially prepared saturated brine made from waste salts or other suitable reagents, we have also found that saturated brines of natural origin are also of value. For example we have, in the past, employed and found effective the natural saturated brine of Searles Lake for the purpose of this invention. We have found that with such brine we are able to maintain temperatures within the evaporator chamber 1 of Figure 1 in the neighborhood of 12° F. lower than when employing essentially pure water at the same temperature. The brine so employed containing the heat and also the condensate from the hot liquor may be discarded, or it may be evaporated for the recovery of its valuable constituents. The heat so obtained is of no value when subsequent evaporation of such brine is considered; for it must be remembered that said heat was so imparted by the condensation of water vapor, and an equal quantity of heat must be utilized in the process of evaporation for the removal of said condensed vapor. Hence it is not intended that the spirit of this invention should portend toward the conservation of the energy of the system; but deals only with means for economically obtaining lower partial pressures within barometric evaporative equipment operating under adverse climatic conditions.

Certain modifications of the processes of operation may be made without departing from the spirit of this invention. For example, we have found it advantageous to conduct the cooling of hot liquor in two stages. In the first stage we employ suitable equipment, supplying spray-tower-cooled, or other suitable water for the removal of the greater part of the sensible heat of the hot liquor. We then transfer the partially cooled liquor to suitable evaporative cooling equipment, such as shown in the single figure of the drawing, therein completing the cooling by means of the saturated brine according to the method of this invention. By these means we are able to cool the hot liquor to the desired temperature without necessitating the use of excessive quantities of saturated brine, which further increases the efficiency and economy of the process of this invention.

We claim:

1. A process of evaporative cooling which comprises first forming a cool condensing medium by dissolving salts, passing the liquid to be evaporated in an evaporative zone, and passing the vapors from said evaporative zone into contact with such condensing medium, thereby to condense said vapors and to create a pressure less than atmospheric in said evaporative zone.

2. A process of evaporative cooling which comprises passing the liquid to be cooled into an evaporating zone, passing the vapors from said zone into contact with a condensing medium of lower vapor pressure than such vapors and saturated in salts, thereby to condense said vapors and to create a pressure less than atmospheric in said evaporating zone, and pre-cooling said condensing medium by dissolving therein the necessary salts to produce substantial saturation.

3. A process of evaporative cooling which comprises passing the hot liquid into an evaporating zone wherein it is subjected to reduced pressure sufficient to vaporize part of the liquid and cooling the liquid through the removal of heat of vaporization, passing the vapors from such evaporating zone into a condensing zone in which they are contacted with a condensing medium, and employing a saturated brine as such condensing medium.

4. A process of evaporative cooling which comprises adding salt to an aqueous solvent in order to cool said solvent by heat of solution of said salt passing the hot liquid into an evaporating zone where it is subjected to reduced pressure sufficient to vaporize a part of the liquid while cooling the liquid through removal of heat of vaporization, and passing the vapors from said evaporating zone into a barometric condensing zone wherein they are directly contacted with the cooled aqueous solution containing said salts.

5. A process of evaporative cooling a salt brine solution, which comprises passing the brine hot into an evaporating zone where it is subjected to reduced pressure sufficient to vaporize a part of the brine while simultaneously cooling the remaining brine through the removal of heat of vaporization, passing the vapors from the evaporating zone into a condensing zone in which they are directly contacted with a condensing medium, which condensing medium consists of a sludge of salt brine and suspended salts.

6. A process of evaporative cooling, which comprises passing a hot liquid into an evaporating zone where it is subjected to reduced pressure sufficient to vaporize a part of the liquid while cooling the liquid through removal of heat of vaporization, and passing the vapors from said evaporating zone into a barometric condensing zone adapted to provide the reduced pressure for the evaporating zone, in which barometric condensing zone the vapors are directly contacted with a sludge of salt brine and suspended salts, whereby a lower cooling temperature is derived due to the heat of solution of the suspended salts of said cooling medium in the condensing vapors from the evaporating zone.

Signed at Trona, California this 25th day of June, 1929.

CHARLES F. RITCHIE.
WILLIAM A. GALE.